A. F. BATCHELDER.
CAR TRUCK.
APPLICATION FILED JAN. 29, 1908.
901,944.
Patented Oct. 27, 1908.
3 SHEETS—SHEET 1.
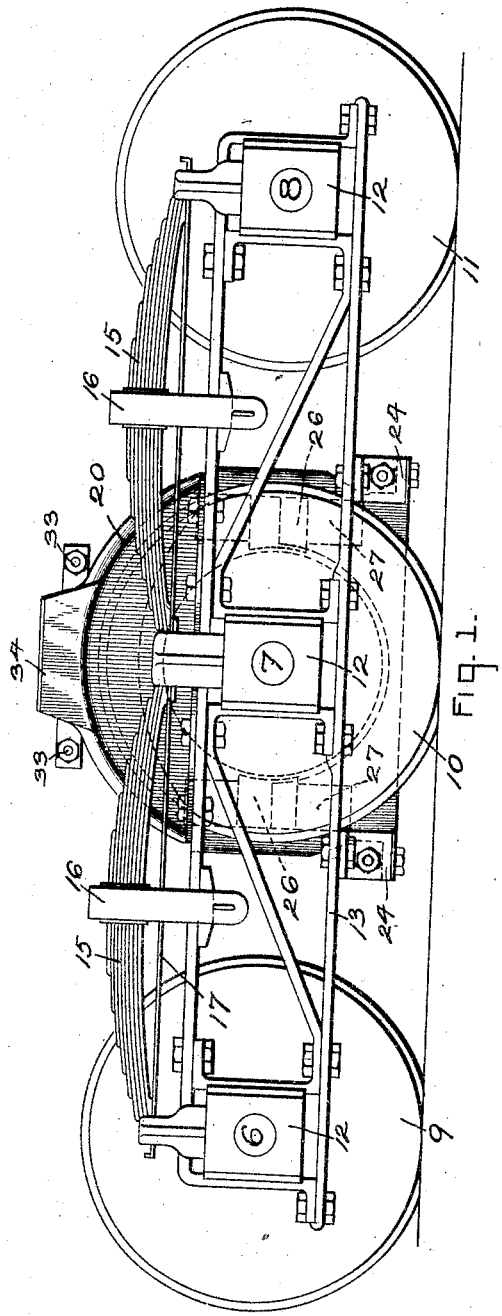
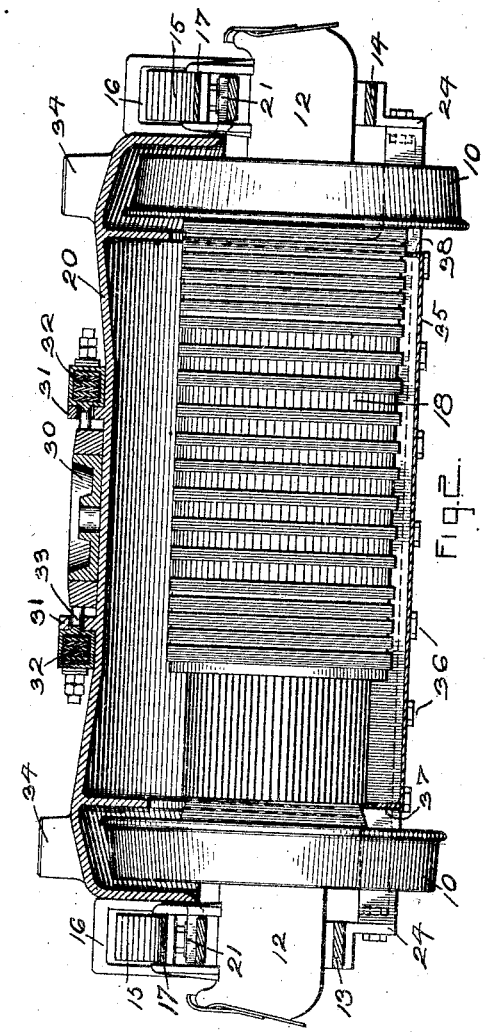
WITNESSES
INVENTOR.
ASA F. BATCHELDER,
by
ATTY.

A. F. BATCHELDER.
CAR TRUCK.
APPLICATION FILED JAN. 29, 1908.

901,944.

Patented Oct. 27, 1908.

3 SHEETS—SHEET 2.

WITNESSES.

INVENTOR
ASA F. BATCHELDER by

ATTY.

A. F. BATCHELDER.
CAR TRUCK.
APPLICATION FILED JAN. 29, 1908.

901,944.

Patented Oct. 27, 1908.

3 SHEETS—SHEET 3.

WITNESSES
Benjamin B. Hull
Helen Oxford

INVENTOR.
ASA F. BATCHELDER
by Albert G. Davis
ATTY.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

CAR-TRUCK.

No. 901,944.   Specification of Letters Patent.   Patented Oct. 27, 1908.

Application filed January 29, 1908. Serial No. 413,169.

*To all whom it may concern:*

Be it known that I, ASA F. BATCHELDER, a citizen of the United States, residing at Schenectady, county of Schenectady, State of New York, have invented certain new and useful Improvements in Car-Trucks, of which the following is a specification.

My invention relates to car trucks, and particularly to trucks having an electric motor incorporated therein and adapted to drive two or more of the wheels of the truck.

My invention has for an object to provide a simple, substantial and easily constructed truck. In attaining these ends I have so arranged a frame on the side frames of the truck that it serves both as the field frame of the motor and as the bolster upon which the body of the car rests.

Figure 5:
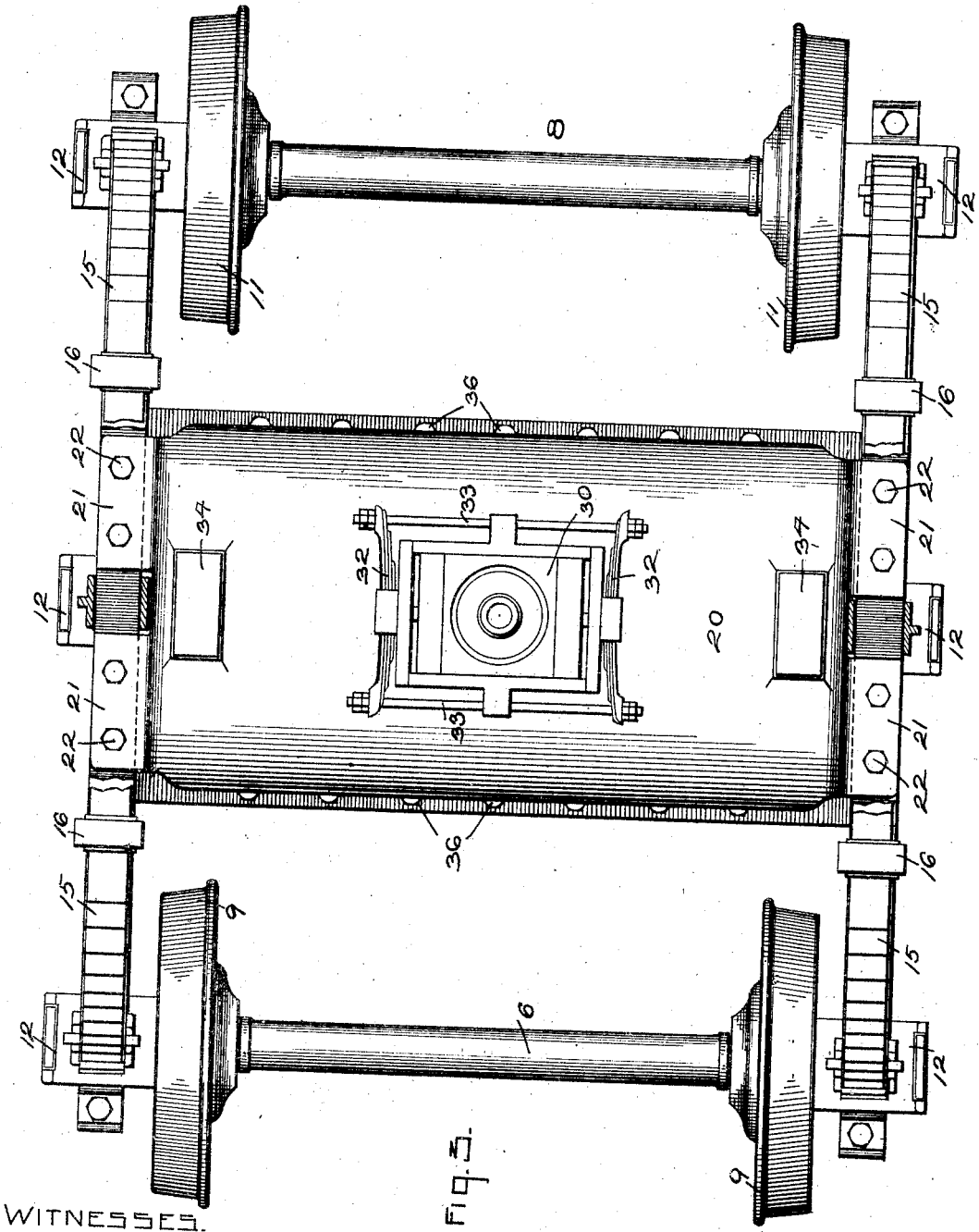
Figure 4:
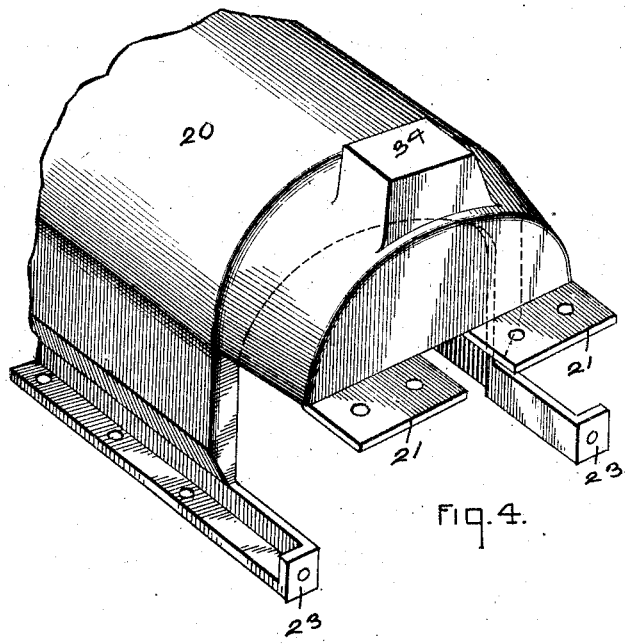
Figure 5:
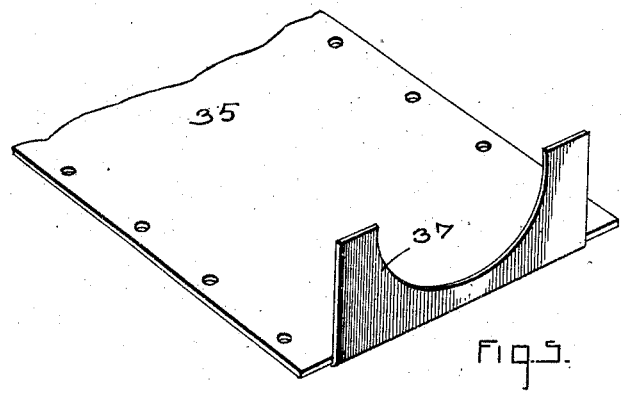

My invention will be understood from the following description taken in connection with the accompanying drawings, in which Figure 1 is a side elevation of a truck having my invention embodied therein; Fig. 2 is a transverse cross-section through practically the middle of the truck shown in Fig. 1; Fig. 3 is a plan view of the same truck, certain parts being broken away to show the construction; Fig. 4 is a perspective view of one end of the combined bolster and field frame casting; and Fig. 5 is a perspective view of one end of the cover which closes the bottom of the frame shown in Fig. 4.

The truck in which I have shown my invention as embodied has three axles 6, 7 and 8, upon which are mounted wheels 9, 10 and 11. The axles 6, 7 and 8 run in journal boxes 12 arranged to slide in the side frames 13 and 14, said side frames being supported on said journal boxes by springs 15 and straps 16 in any suitable and well-known manner. A sheet metal strap 17 may be interposed between the ends of the springs 15 and the extended tops of the journal boxes 12 in order to provide a good sliding surface for the ends of the springs, and at the same time to prevent the springs from tending to move the journal boxes longitudinally of the frame. The armature 18 of the driving motor is mounted on the axle 7 in any well-known and suitable manner.

The side frames 13 and 14 are held apart and in fixed relation to one another by a casting 20, of the form shown in Figs. 1 to 4, which casting is secured to the upper part of the side frames by lugs 21 and bolts 22, the lower part of the frame 20 being secured to the bottom of the side frames 13 and 14 by means of lugs 23 bolted to angle-irons 24 bolted to the side frames 13 and 14. This frame 20 extends over the middle pair of wheels, and over and down upon each side of the armature 18.

Integral with and secured to the casting 20 are the pole pieces 26 which are surrounded by the field coils 27, and it is apparent that the casting 20 will serve as the field frame of the motor. Upon the top of the casting 20 and secured thereto or made integral therewith, is a king pin socket which may be of any suitable design. In the arrangement shown a member 30, having a hole therein for the reception of the king pin, is arranged to slide transversely of the truck between lugs 31, integral with the casting 20, against the tension of springs 32, the ends of which are connected by tie rods 33 in a manner well known in this art. Lugs 34 made integral with the casting 20 have sliding engagement with the bottom of the car body and serve to help support the same in the usual manner. The casting 20 serves, therefore, as a bolster as well as a motor-field frame. The lower part of the frame 20 is closed by means of a sheet metal cover 35 which may be bolted to the part 20 by means of bolts 36. The plate 35 has at one end an up-turned portion 37 which is cut out concentric with the commutator of the armature 18 and serves to prevent dirt from working into the armature. On the other end of the cover 35 is an up-turned web 38 which helps to close the other end of the casing formed by the casting 20 and the cover 35. The motor brushes have not been illustrated since they form no part of my invention. They may be secured in any suitable manner to the inside of the casting 20.

While I have shown but one form in which my invention may be embodied, I do not wish to be understood as limiting myself in the following claims to this particular construction. It is my intention to cover all such modifications as may occur to those skilled in this art and which do not depart from the spirit of my invention.

What I claim as new and desire to secure by Letters Patent of the United States, is,—

1. In a car truck, a plurality of wheels and axles, journal boxes for said axles, side frames in which said journal boxes may move vertically, springs for supporting said frames on said journal boxes, a motor armature mounted on one axle, and a combined bolster and motor field frame supported on said side frames.

2. In a car truck, a plurality of wheels and axles, journal boxes for said axles, side frames in which said journal boxes may move vertically, springs for supporting said frames on said journal boxes, a motor armature mounted on one axle, and a frame supported on said side frames and extending over and down upon each side of said armature and adapted to serve both as a bolster and as a motor field frame.

3. In a car truck, three axles having wheels thereon, journal boxes for said axles, side frames in which said journal boxes may move vertically, springs for supporting said frames on said journal boxes, a motor armature mounted on the middle axle, and a combined bolster and motor field frame supported on said side frames and extending from one to the other over the motor armature.

4. In a car truck, three axles having wheels thereon, journal boxes for said axles, side frames in which said journal boxes may move vertically, springs for supporting said frames on said journal boxes, a motor armature mounted on the middle axle, and a frame supported on said side frames and extending over the middle pair of wheels and over said armature and down upon each side thereof, said frame being adapted to serve both as a bolster and as a motor field frame.

5. In a car truck, three axles having wheels thereon, journal boxes for said axles, side frames in which said journal boxes may move vertically, springs for supporting said frames on said journal boxes, a motor armature on the middle axle, and a one piece frame supported on said side frames and extending over the middle pair of wheels and over and down on each side of said armature and having pole pieces integral therewith, said one piece frame being adapted to serve both as a bolster and as a motor field frame.

6. In a car truck, three axles having wheels thereon, journal boxes for said axles, side frames in which said journal boxes may move vertically, springs for supporting said frames on said journal boxes, a motor armature mounted on the middle axle, a bolster frame supported on said side frames and extending over said motor armature and down upon each side thereof, and field coils supported by said bolster frame and surrounding field poles formed integral with said bolster frame.

In witness whereof, I have hereunto set my hand this 27th day of January, 1908.

ASA F. BATCHELDER.

Witnesses:
   HELEN ORFORD,
   BENJAMIN B. HULL.